(No Model.) 3 Sheets—Sheet 1.
S. H. TERRY.
SASH FASTENER AND OPERATOR.
No. 566,428. Patented Aug. 25, 1896.
Fig. I.
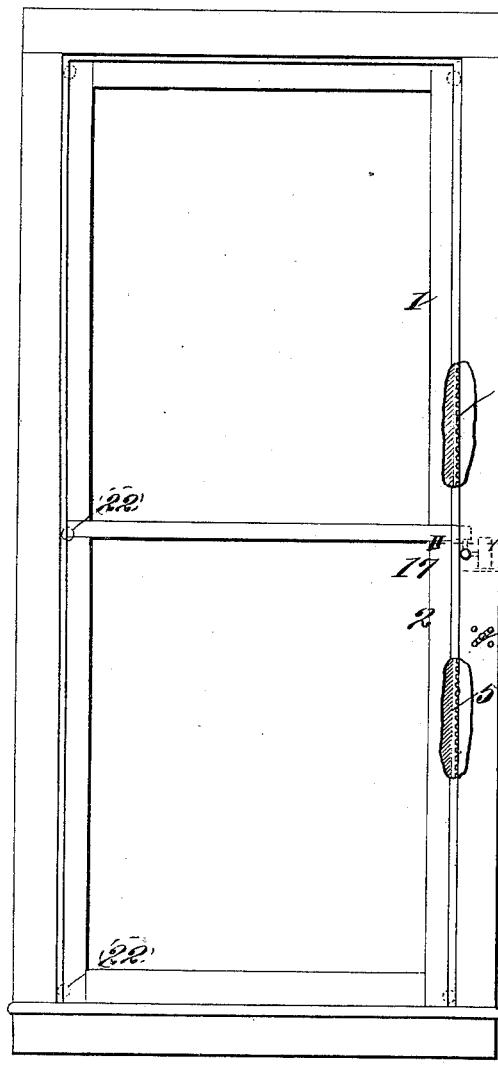
Fig. II.
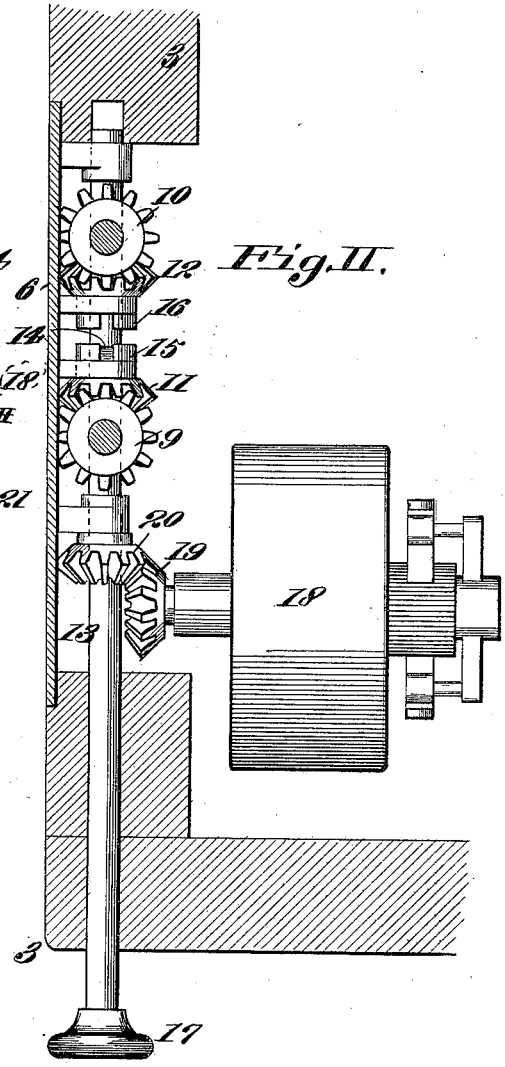
Attest,
Stanley Stoner
E. Knight
Inventor,
Samuel H. Terry
By Knight Bro
attys (No Model.) S. H. TERRY. 3 Sheets—Sheet 2.
SASH FASTENER AND OPERATOR.
No. 566,428. Patented Aug. 25, 1896.
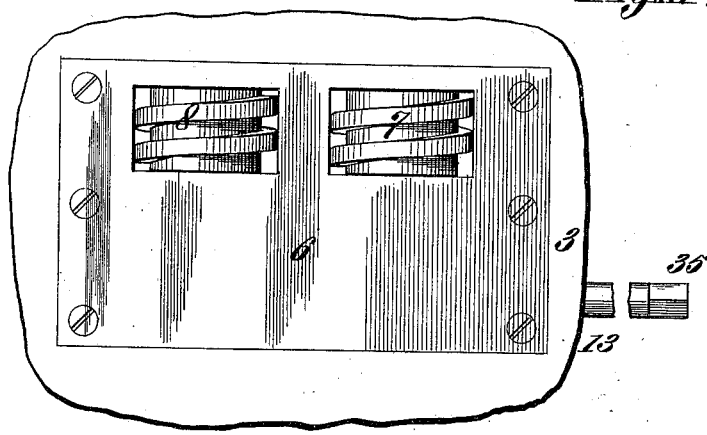
Fig. III.
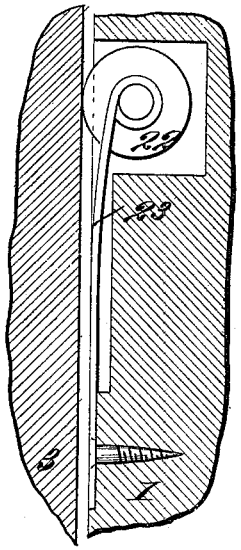
Fig. XI.
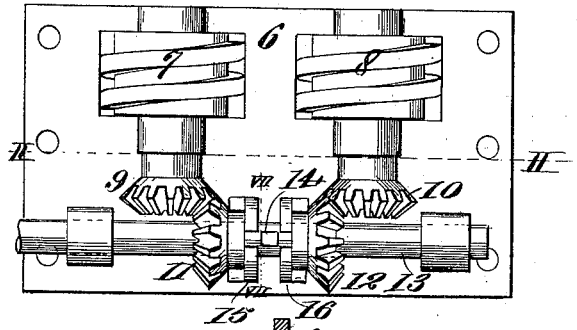
Fig. IV.
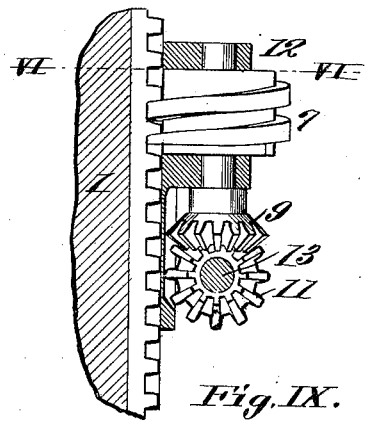
Fig. V.
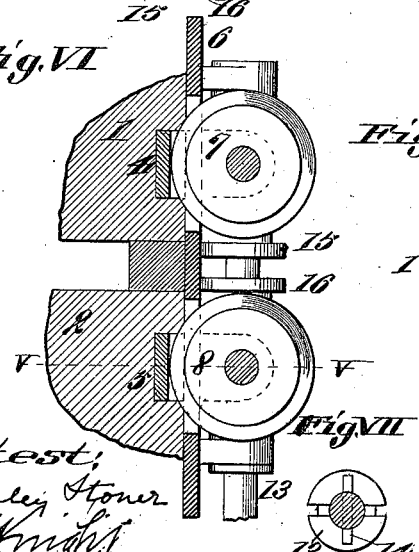
Fig. VI.
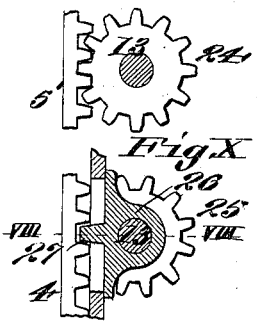
Fig. IX.
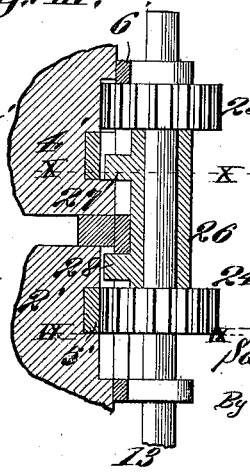
Fig. VIII.
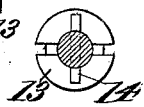
Fig. VII.
Attest:
Stanley Stoner
E. S. Knight
Inventor:
Samuel H. Terry
By Knight Bros.
Att'ys (No Model.)   3 Sheets—Sheet 3.
S. H. TERRY.
SASH FASTENER AND OPERATOR.
No. 566,428.  Patented Aug. 25, 1896.
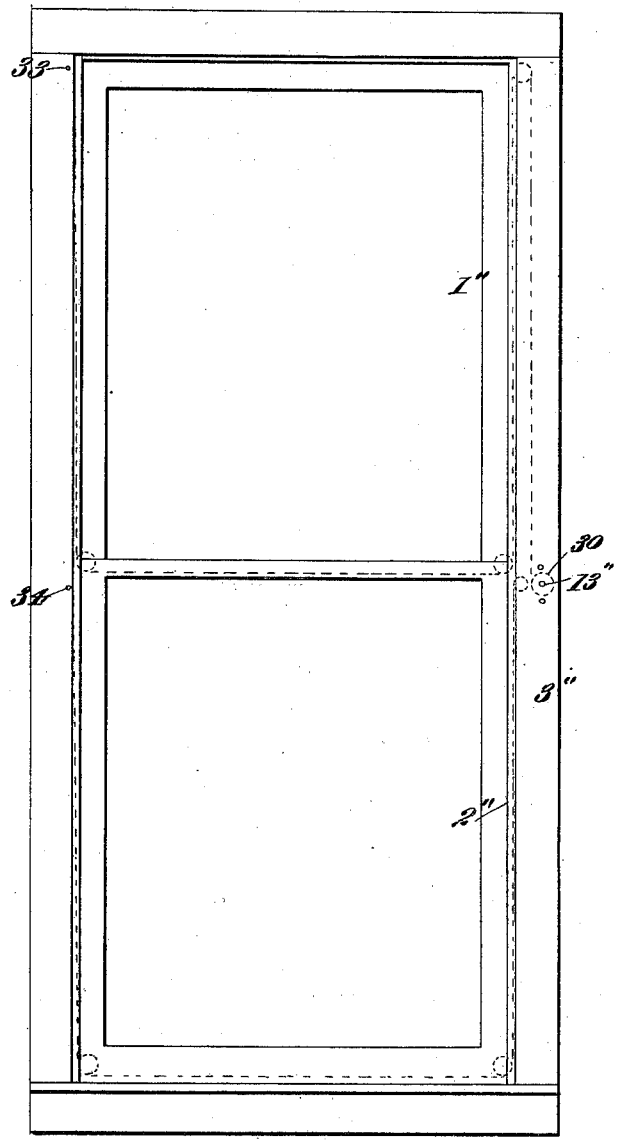
Fig. XII
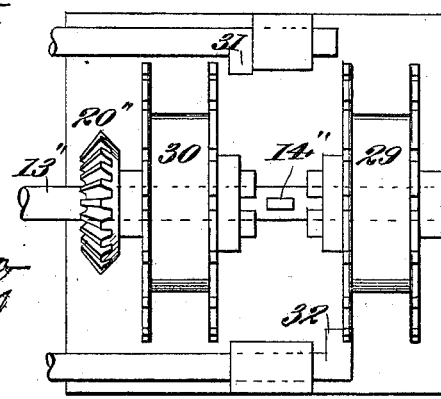
Fig. XIII.
Attest:
Stanley Stoner
E. R. Knight
Inventor:
Samuel H. Terry
By Knight Bro.
attys

UNITED STATES PATENT OFFICE.

SAMUEL H. TERRY, OF ST. LOUIS, MISSOURI, ASSIGNOR OF ONE-HALF TO SMITH P. GALT, OF SAME PLACE.

SASH FASTENER AND OPERATOR.

SPECIFICATION forming part of Letters Patent No. 566,428, dated August 25, 1896.

Application filed March 26, 1896. Serial No. 584,909. (No model.)

*To all whom it may concern:*

Be it known that I, SAMUEL H. TERRY, of the city of St. Louis, State of Missouri, have invented a certain new and useful Improvement in Sash-Operators, of which the following is a full, clear, and exact description, reference being had to the accompanying drawings, forming part of this specification.

My invention consists in certain improvements to be applied to windows, whereby the opening, closing, and locking of the window may be easily accomplished, and it possesses features of novelty hereinafter specifically pointed out and claimed.

Referring to the drawings forming a part of this specification, Figure I shows a front elevation of a window and frame, portions thereof being broken away to expose the rack on the sash. Fig. II is a cross-section of the frame, taken along the line II II of Figs. I and IV, showing the operating mechanism in detail. Fig. III is a side elevation of a portion of the frame, showing the worm to operate the rack on the sash. Fig. IV is a back view of the same. Fig. V is a vertical section taken along the line V V of Fig. VI to show the worm and rack to operate the sash. Fig. VI is a cross-section taken along the line VI VI of Fig. V. Fig. VII is a detail view of the locking-key, taken along the line VII VII of Fig. IV. Fig. VIII is a cross-section taken along the line VIII VIII of Fig. X, showing a pinion to operate the rack instead of a worm. Fig. IX is a vertical section taken along the line IX IX of Fig. VIII. Fig. X is a vertical section taken along the line X X of Fig. VIII, showing the sash locked. Fig. XI is a vertical section of one corner of the sash, showing the roller therein to prevent binding. Fig. XII is a front elevation of a window, showing a modified form of construction. Fig. XIII is a back view of the said modified device placed in the window-frame for operating the sash.

1 is the upper and 2 is the lower window-sash. 3 is the window-frame. In the edge of the sash are placed racks 4 and 5. Revolving in collars fastened to a plate 6 in the frame are worms 7 and 8, which have bevel-gears 9 and 10 on the ends of their respective shafts. These bevel-gears engage gears 11 and 12, loosely mounted on the movable shaft 13. This shaft 13 carries a pin 14, which by the movement of the shaft is adapted to engage a slot in collars 15 or 16, attached to the gears 11 and 12, to couple the gears with the shaft, so that they may be rotated with it. The revolving of the shaft 13 can, by pushing said pin 14 into one or the other of these slots, be made to turn the respective bevel-gear and with it the worm which moves the rack, thus accomplishing the raising or lowering of the window-sash. The longitudinal movement of shaft 13 is accomplished by pushing or pulling the key 17, placed on the outside of the window-frame.

18 is an electric motor used to revolve gear 19, which meshes with gear 20, which is mounted on shaft 13, so as to turn with it and allow the shaft to move longitudinally. This motor is placed in the window-frame and is operated by a switch 21 in the side thereof. I prefer to obtain the power to operate this motor from an ordinary dry battery, but any source of electricity may be used. By means of the switch the current is turned on or off the motor, and the motor may be made to turn in either direction, so as to raise and lower the sashes. The key 17 controls the gears that operate the worms, so that the window is entirely under one's management by using the only exposed elements, namely, the key 17 and switch 21.

To prevent the sash from binding, I use a roller 22 in each corner thereof, preferably placed on a spring-axis 23 to allow for swelling or shrinking of the wood. Said rollers are recessed and allow the free starting of the sash from any position. Instead of a worm, I may use a pinion 24 or 25, Figs. VIII, IX, and X. These pinions are connected by a sleeve 26, which is provided with lugs 27 and 28, adapted to be moved by the shaft 13' and engage the racks 4' or 5'. Thus when it is desired to operate sash 2', Fig. VIII, the lug 27 is drawn into engagement with rack 4' by means of the shaft 13', and pinion 24 into engagement with rack 5', and the power applied. It will be seen that the sash 1' is locked while 2' is being moved. Both are locked when not being moved, but when one is moved the other is locked.

In Figs. XI and XII, I have shown a means for raising the sash, consisting of a cord wound around reels 29 or 30. These are locked by keys 31 and 32. The cords are fastened at 33 and 34 and pass over pulleys on the under parts of the sash to the said reels.

Instead of using the electric motor described, an ordinary key may be used to turn the shaft 13 by engaging its end 35, Fig. III.

I have not shown any means for counterbalancing the weight of the sash, but an ordinary cord and weight may be used.

I claim as my invention—

1. The combination of a pair of sliding sashes provided with a rack on one of their edges, independent worm-gears in engagement with said racks, a single shaft having separate means loosely mounted thereon which have a turning connection with the worm-gears, a means for coupling either of them to the shaft, and suitable means for turning the shaft substantially as shown and described.

2. In a combination with a plurality of window-sash, an electric motor, mechanical driving connection between said motor and each sash, a hand-operated clutch controlling each of said connections and a hand-controlled switch for said motor, substantially as and for the purpose set forth.

SAMUEL H. TERRY.

In presence of—
STANLEY STONER,
E. S. KNIGHT.